United States Patent
Boutcher et al.

(10) Patent No.: US 9,003,328 B1
(45) Date of Patent: *Apr. 7, 2015

(54) METHOD AND SYSTEM OF PROVIDING ENHANCED APPOINTMENT NOTIFICATION SERVICE TO MOBILE DEVICES

(71) Applicant: West Corporation, Omaha, NE (US)

(72) Inventors: James K. Boutcher, Omaha, NE (US); Michael T. Mateer, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,501

(22) Filed: Apr. 8, 2014

Related U.S. Application Data

(63) Continuation of application No. 12/546,159, filed on Aug. 24, 2009, now Pat. No. 8,707,206.

(51) Int. Cl.
*G06F 3/0482* (2013.01)
*G06Q 10/10* (2012.01)

(52) U.S. Cl.
CPC ......... *G06Q 10/1095* (2013.01); *Y10S 715/963* (2013.01)

(58) Field of Classification Search
CPC . G06F 1/1626; G06F 3/0481; G06F 9/44543; G06F 3/0482; G06F 17/30864; G06F 7/24; G06F 17/30286; H04L 29/06; G06Q 10/109; G06Q 10/0631; G06Q 10/06311; G06Q 10/063116; G06Q 10/1093
USPC ......... 715/733, 764, 765, 808, 810, 864, 963; 345/169; 705/7.12, 7.13, 7.16, 7.18; 707/705, 736, 752, 805; 709/203, 204
See application file for complete search history.

(56) References Cited

U.S. PATENT DOCUMENTS

| | | | |
|---|---|---|---|
| 6,757,898 | B1 | 6/2004 | Ilsen et al. |
| 7,174,303 | B2 * | 2/2007 | Glazer et al. ................. 705/7.19 |
| 7,188,073 | B1 | 3/2007 | Tam et al. |
| 7,869,941 | B2 | 1/2011 | Coughlin et al. |
| 8,150,718 | B2 | 4/2012 | Olliphant |
| 8,364,513 | B2 * | 1/2013 | Mitchell et al. .............. 705/7.13 |
| 2005/0055252 | A1 | 3/2005 | Todd |
| 2006/0116918 | A1 | 6/2006 | Flora et al. |
| 2007/0078697 | A1 | 4/2007 | Nixon |
| 2007/0167688 | A1 | 7/2007 | Ross et al. |
| 2007/0271129 | A1 | 11/2007 | Dutton et al. |
| 2007/0280459 | A1 | 12/2007 | Yee et al. |
| 2007/0282654 | A1 * | 12/2007 | Sarkar ............................... 705/8 |
| 2007/0282656 | A1 | 12/2007 | Battcher et al. |
| 2009/0006994 | A1 | 1/2009 | Forstall et al. |
| 2009/0106036 | A1 | 4/2009 | Tamura et al. |
| 2009/0265229 | A1 | 10/2009 | Sidhu |
| 2010/0094678 | A1 | 4/2010 | Gupta et al. |
| 2010/0153487 | A1 | 6/2010 | Greven et al. |
| 2010/0157742 | A1 * | 6/2010 | Relyea et al. ................... 368/28 |
| 2010/0269049 | A1 | 10/2010 | Fearon |
| 2011/0029343 | A1 | 2/2011 | Darreff et al. |

* cited by examiner

*Primary Examiner* — Xiomar L Bautista

(57) ABSTRACT

A mobile device includes a client application configured to process and display a push notification specifying an appointment reminder originating from a server acting as an appointment manager. The client displays a menu of available options for conducting additional appointment-related transactions, such as confirmation, rescheduling, or cancellation of the appointment. Based on the user selection, the client conducts a user-interactive transaction with the server to complete the requested appointment service.

20 Claims, 10 Drawing Sheets

METHOD AND SYSTEM OF PROVIDING ENHANCED APPOINTMENT NOTIFICATION SERVICE TO MOBILE DEVICES

CROSS-REFERENCE TO RELATED APPLICATIONS

This application is a continuation from U.S. patent application Ser. No. 12/546,159, filed Aug. 24, 2009, and entitled "METHOD AND SYSTEM OF PROVIDING ENHANCED APPOINTMENT NOTIFICATION SERVICE TO MOBILE DEVICES". This patent application is also related to patent application Ser. No. 12/546,119, filed Aug. 24, 2009, and entitled "SYSTEM AND METHOD FOR MANAGING PAYMENTS USING A COMMUNICATION DEVICE", the entire contents of which are incorporated by reference herein.

FIELD OF THE INVENTION

This invention relates to notification services for mobile devices and in particular to a method and system that provides a mobile device with interactive features enabling a user to reply to an appointment reminder.

BACKGROUND OF THE INVENTION

Users of mobile devices can subscribe to services that provide the user with data under certain circumstances. For example, stock updates can be transmitted to the mobile device at periodic intervals or, especially, when the stock price meets a certain predetermined threshold.

These types of subscription services can also facilitate schedule management. A user can maintain a virtual calendar of appointments by enlisting the service to notify the user of upcoming appointments. These reminders can be scheduled at times or intervals that the user predetermines.

Typical protocols for providing such appointment reminders do nothing more than simply send the user, via the mobile device, a notification that an appointment is upcoming. Details of the appointment may be furnished within the contents of the notification, such as the time, place, and party, but the notification process is strictly passive. If the user needs to change some aspect of the appointment, it must be done off-line, namely, separately and independently from the appointment notification service.

A client application is typically installed in the mobile device to handle incoming messages from the notification service. These messages typically employ an audio-visual indication; for example, a pop-up alert message, a distinctive, sound, or a number badging the application (or some combination of these). The message, though, is typically presented alongside whatever other applications are running on the mobile device. For example, in the case of an alert message, a pop-up simply appears on the screen, overlying whatever happens to be the current content on display.

What is needed is a system and method for providing a mobile device with a functionality enabling a user to conduct user-interactive, appointment-related transactions with a server facility. The transaction will preferably involve bi-directional communications between the mobile device and server, placed within the context of the user making a reply to an appointment reminder. The user can thus take further action, and execute additional tasks, beyond the appointment reminder itself.

What is further needed is a system and method for configuring a mobile device with a functionality that provides a dedicated application environment for processing and managing incoming appointment notifications, so that presentations to the user can be made with dedicated, customized screens having selected formats.

SUMMARY OF THE INVENTION

In one aspect of the disclosure, there is provided, in an environment including a server and a user mobile device, a method that comprises: the server communicating an appointment reminder notification to the mobile device; the mobile device processing the notification, the mobile device processing includes providing the user with a plurality of appointment-related transaction selections; and the user, via the mobile device, and the server conducting a user-interactive transaction, according to a transaction selection made by the user.

In one aspect of the disclosure, there is provided a mobile device for use in an environment including a data network and a communications network connecting the mobile device and the data network, the mobile device comprising: a client application; the client application having a first functionality configured to process an appointment reminder notification received from the data network, and to present the notification to the user; the client application having a second functionality configured to enable the user to select at least one of a plurality of appointment-related transaction selections; and the client application having a third functionality configured to enable the user to conduct, via the mobile device, a user-interactive transaction with the data network, according to a transaction selection made by the user.

In one aspect of the disclosure, there is provided, in an environment including a user mobile device, a data network, and a communications network connecting the mobile device and the data network, a computer-readable medium resident on the mobile device, the computer-readable medium comprising computer-executable instructions for execution by a processor, that, when executed, cause the processor to: process an appointment reminder notification communicated from the data network; present the notification to the user; and enable the user to conduct, via the mobile device, a user-interactive appointment-related transaction with the data network.

BRIEF DESCRIPTION OF THE DRAWINGS

Reference will now be made to specific embodiments, presented by way of example only, and to the accompanying drawings in which.

DETAILED DESCRIPTION OF THE INVENTION

Figure 1:
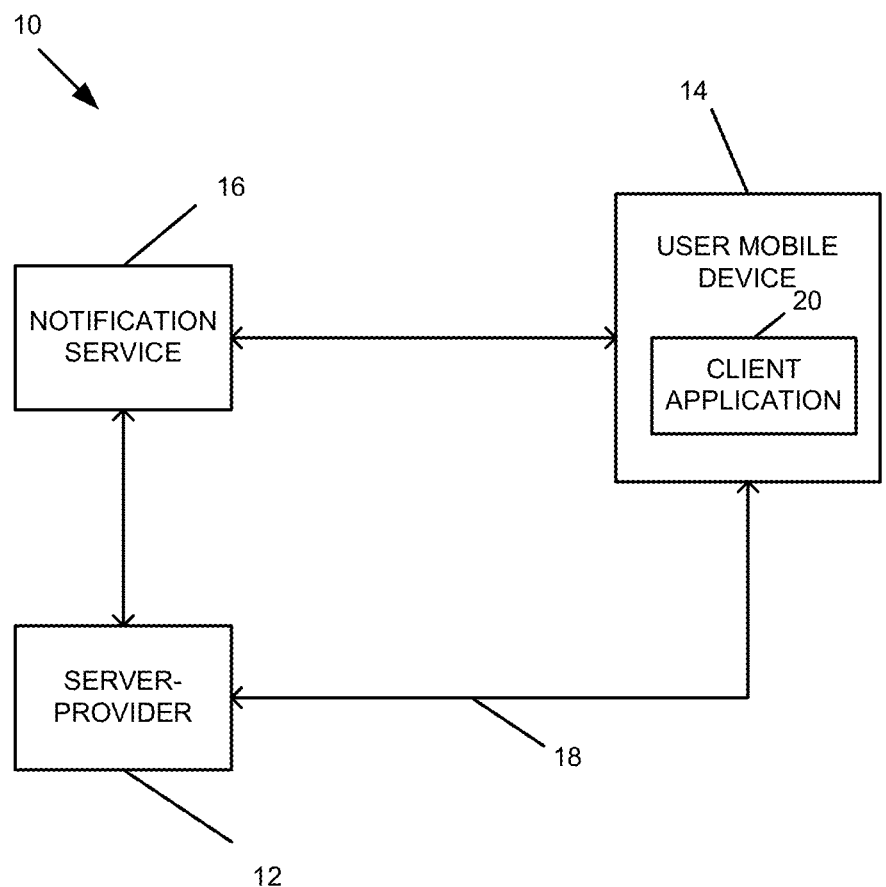
FIG. 1 is a block diagram illustration of a system to furnish remote appointment reminders, according to the invention.

Referring to FIG. 1, a system 10 enables appointment reminders to be communicated from a server-provider 12 to a user mobile device 14 using a notification service 16. System 10 also allows the user to conduct a user-interactive, appointment-related transaction with server 12 over communications channel 18.

Mobile device 14 is configured with an on-board client application 20 that manages, directs, and otherwise performs the operations for processing any incoming appointment-related notifications, and for conducting any further tasks relating to the appointment. For example, additional tasks include, but are not limited to, sending a confirmation of the appointment, rescheduling appointments, canceling appointments, and requesting assistance from a customer service department. These tasks can be considered user-interactive transactions that are conducted with server 12.

In view of these additional functionalities, mobile device 14 has an enhanced capability beyond conventional client applications that simply receive a notification and permit nothing more, offering no follow-up services, e.g., confirmation, rescheduling, cancellation. Instead, the invention allows the user to establish a communications session with server 12, over which these additional appointment-related tasks can be conducted at the direction and initiative of the user via client application 20. It is possible, then, for the user to not only receive notification of an appointment reminder, but to conduct a user-interactive, appointment-related transaction with server 12.

Figure 2:
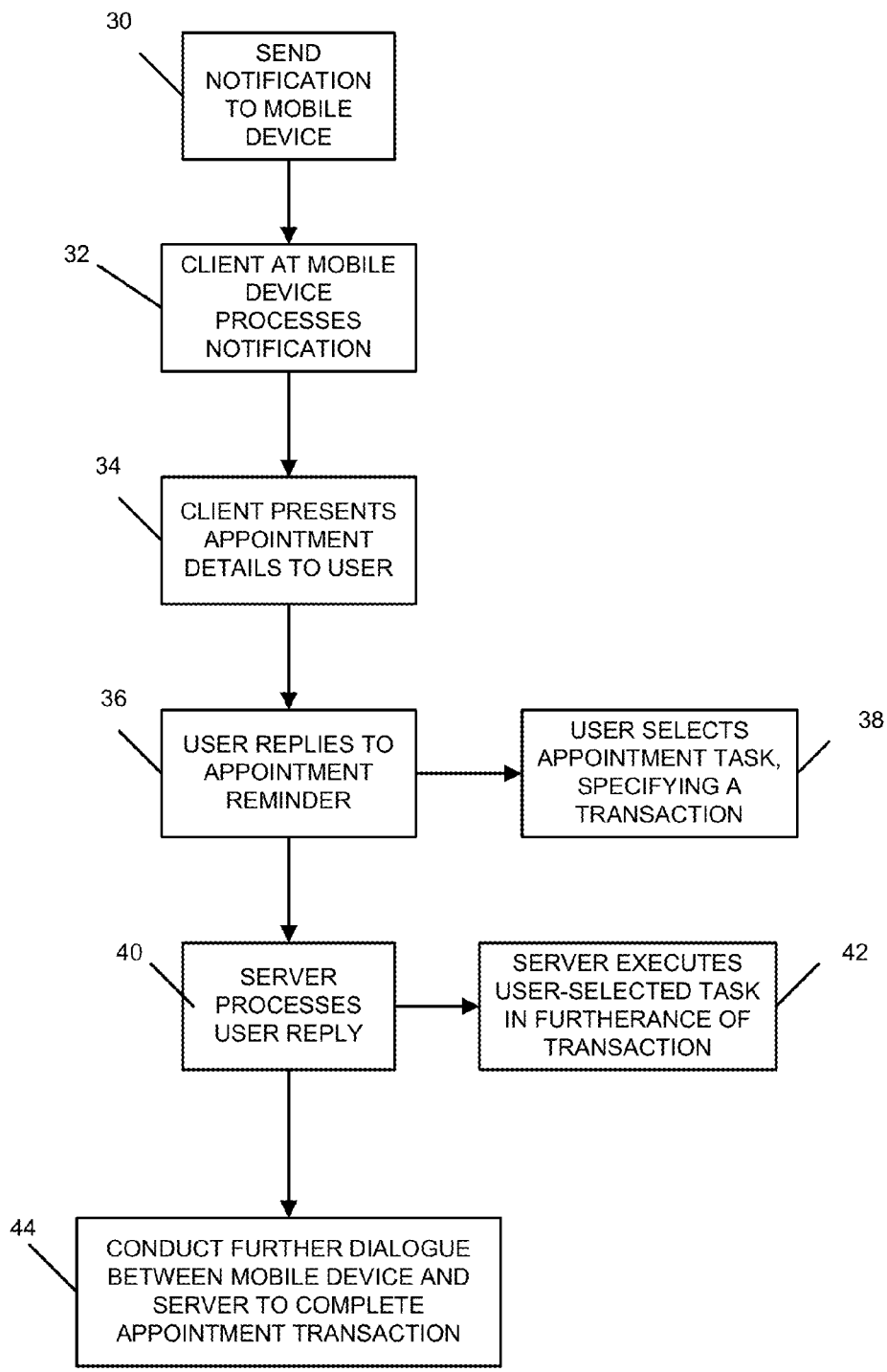
FIG. 2 is a flow diagram illustrating a sequence of operations for conduction an appointment-related transaction, according to the invention.

Reference is made to FIG. 2, which shows a flow diagram to illustrate the process by which the user mobile device 14 (FIG. 1) initially receives the appointment reminder notification, and then conducts a user-interactive appointment-related transaction with server 12, if the user so selects. Reference is also made to FIG. 1.

Initially, a notification is sent to the user mobile device 16, serving to effectively remind the user of an upcoming scheduled appointment (step 30). The notification is sent from notification service 16, although the request to do so (and the contents of the notification) originate with server 12.

Server 12 can be considered any data networking facility that contains the information needed to initiate and populate the appointment reminder. For example, in a typical scenario, server 12 can correspond to the web service of the company with which the user has scheduled the appointment. Alternately, server 12 can be a third party facility that the company has contracted with to manage the appointment reminders.

The notification service 16, in one form, can be a service offered by the server facility 12. Alternately, the notification service 16 can be a third party entity that server (or other affiliated party of interest) has contracted with to provide the notifications.

Any means known to those skilled in the art can be used to transmit the appointment reminder notification from notification service 16 to mobile device 14. The communication techniques can include, but are not limited to, push mechanisms that are specific to the carrier/device. Examples of suitable push mechanisms include push notifications and port-directed SMS.

The payload (contents) of the notifications can be constituted in various ways. In one form, the notification can contain all of the data needed to drive the appointment reminder. For example, this data may include the company logos, company name, appointment time, appointment time ranges, alternate appointment times, customer name, and a company web service URL for status updates. Alternately, the notification can include a reference to a resource that is fetched from server 12 using data channel 18 to retrieve the appointment information, e.g., from a data network or database. For example, the resource can include an https request to a web service. Any remaining notification features necessary to facilitate the notification should be apparent to those skilled in the art.

The client application 20 receives and processes the appointment reminder notification (step 32). For example, upon examination, if the notification contents include all of the data needed to formulate an appointment reminder, then one is generated. Otherwise, if the notification makes reference to a resource for retrieving the necessary reminder data, then the client contacts the resource to request the data, and then proceeds with composing the reminder once the data request is fulfilled.

Once the appointment reminder is generated, the appointment details are presented to the user in a suitable, interactive format (step 34). For example, if the mobile device is an iphone or other similar equipment, then the notification details (appointment reminder) will be displayed on a screen, showing, for example, the company name/logo, appointment description, and appointment time (range).

According to the invention, along with the appointment reminder, the notification also includes user-selectable features that enable the user to conduct optional transactions relating to the appointment. For example, the user can confirm, reschedule, or cancel the appointment.

Once the notification is displayed, then, the user selects the feature (appointment-related transaction) that the user desires, which constitutes the user's reply to the appointment reminder (step 36). The reply corresponds to the user's selection of a particular appointment task, e.g., confirm, reschedule, or cancel the appointment (step 38).

The user's reply to the appointment reminder is communicated to server 12, where the reply is processed (step 40). This processing operation involves executing the user's selected transaction (step 42). For example, the server 12 would take all necessary steps to facilitate confirmation, rescheduling, or cancellation of the appointment, depending upon the transaction selected by the user.

If the appointment-related transaction requires any further communication between the mobile device 14 and the server 12, then the appropriate communications are carried out to facilitate completion of the transaction (step 44).

All of the appointment-related tasks carried out at the mobile device 14 are performed by client application 20. Techniques well known to those skilled in the art can be used to construct the hardware, software, and firmware needed to implement the functionality concerning the processing and management of the appointment reminder notification and any appointment-related transaction requested by the user in response to the notification.

Prior to the sequence of operations in FIG. 2, a preliminary set of operations is preferably conducted before the actual notification is generated and sent to the mobile device. Details for implementing these operations are within the knowledge of those skilled in the art.

According to one typical preliminary setup, first the client application 20 installed on the mobile device 14. The installation can take place as a standalone application for appointment reminders, or a functionality that embedded into another application. For example, the appointment reminder functionality can be embedded into an existing customer service application.

Next, a registration process takes place to establish an association between the client application 20 and the customer (user). Any type of registration mechanism can be used, such as through the mobile application, website, or IVR application, although it should be apparent to those skilled in the art that any suitable registration process can be used. In one form, the association can be implemented in the form of a database that establishes relationships between customers and active users (recipients) of the mobile-based, appointment reminder client application.

As a final setup step, a condition is detected by the server 12 (or other suitable party) for commencing the notification process. For example, the condition signifies when the scheduled appointment is within a definable range (e.g., less than 24 hours away). Once the condition occurs, a query is made to determine if the customer has activated, or is otherwise accessible via, the mobile-based appointment reminder service. For this purpose, the query is made to a database that associates customers to mobile device users having active client applications, using an association of the type formulated during the registration process. If the customer, for whom the current appointment reminder pertains, has the mobile application installed on their phone, then the notification process continues, according to the process in FIG. 2.

Reference is now made to FIG. 3 and FIGS. 4-8 to illustrate an exemplary set of transactions for implementing the system operations shown in FIG. 2. FIGS. 4-8 are graphical user interface (GUI) screen shots of an iphone display (mobile device 14) on which the client application program 20 is running. Client application 20 directs the content of the screen shots and processes any user selections made to options appearing on the display.

Figure 3:
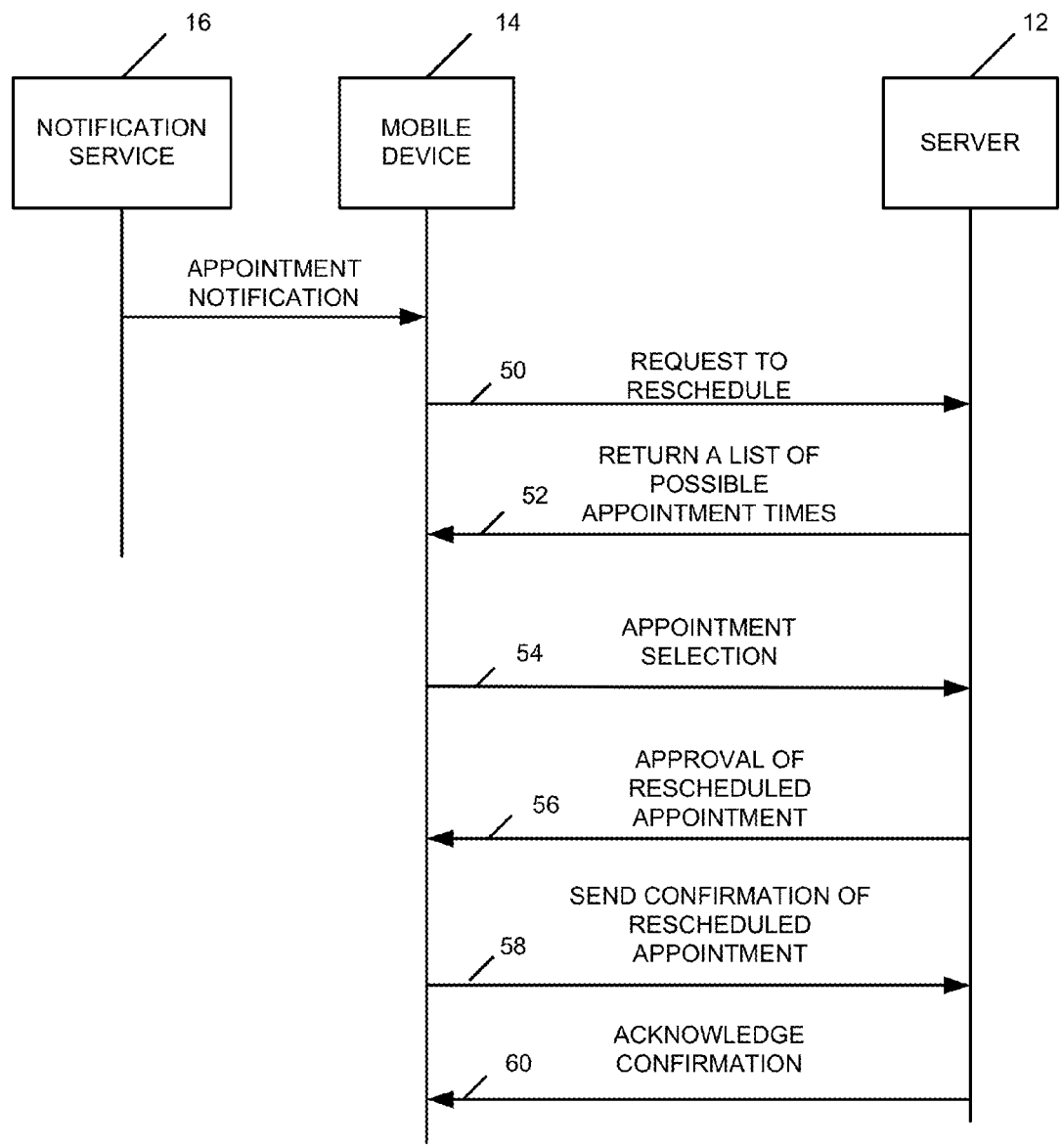
FIG. 3 is a diagram depicting the flow of information to facilitate an appointment-related transaction, namely, an appointment reschedule.
Figure 4:
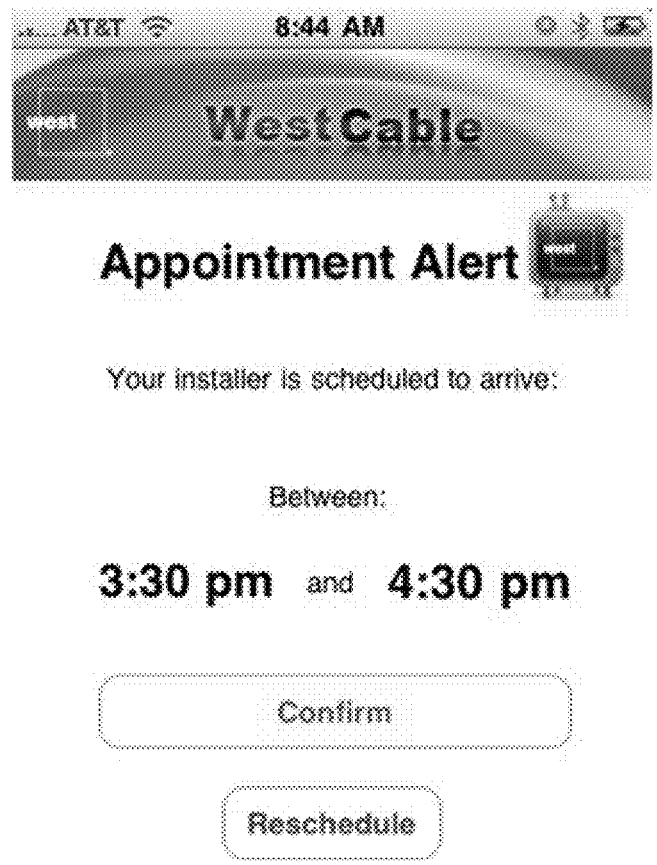
FIGS. 4-8 are GUI screen shots showing various operations pertaining to appointment-related transactions.
Figure 5:
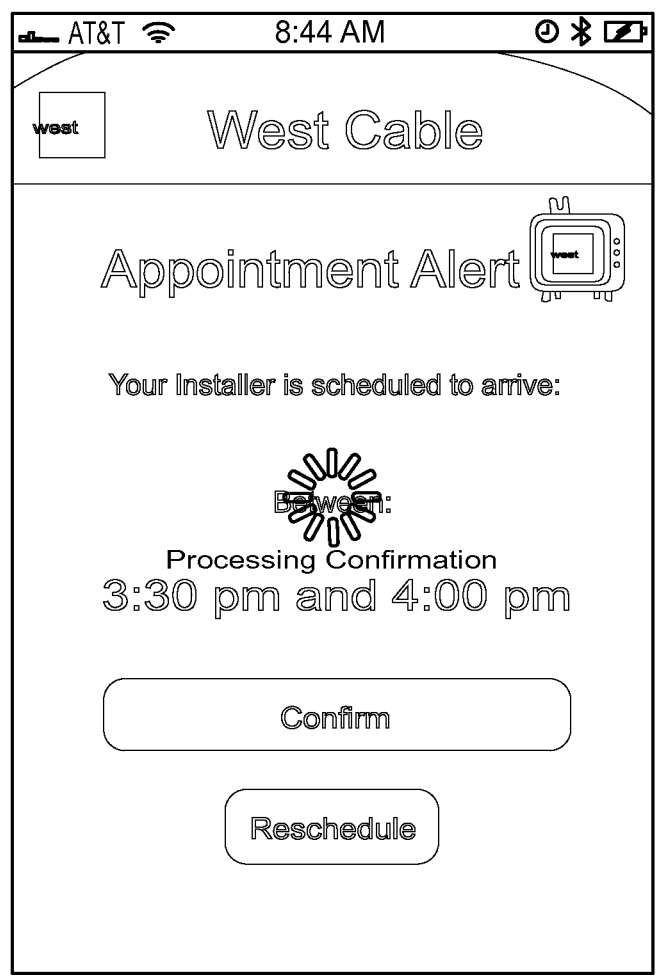
Figure 6:
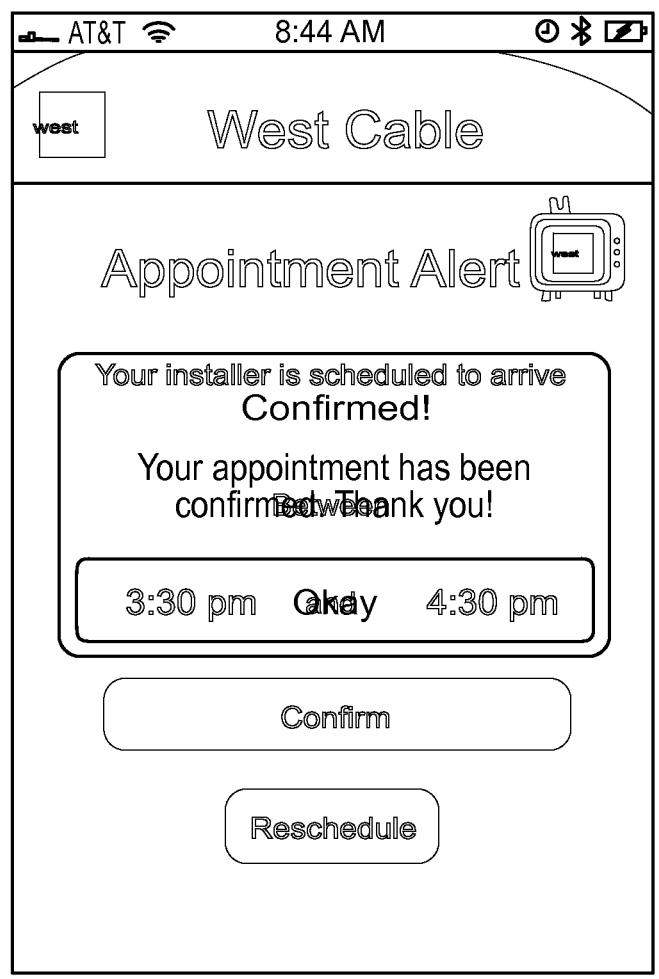
Figure 7:
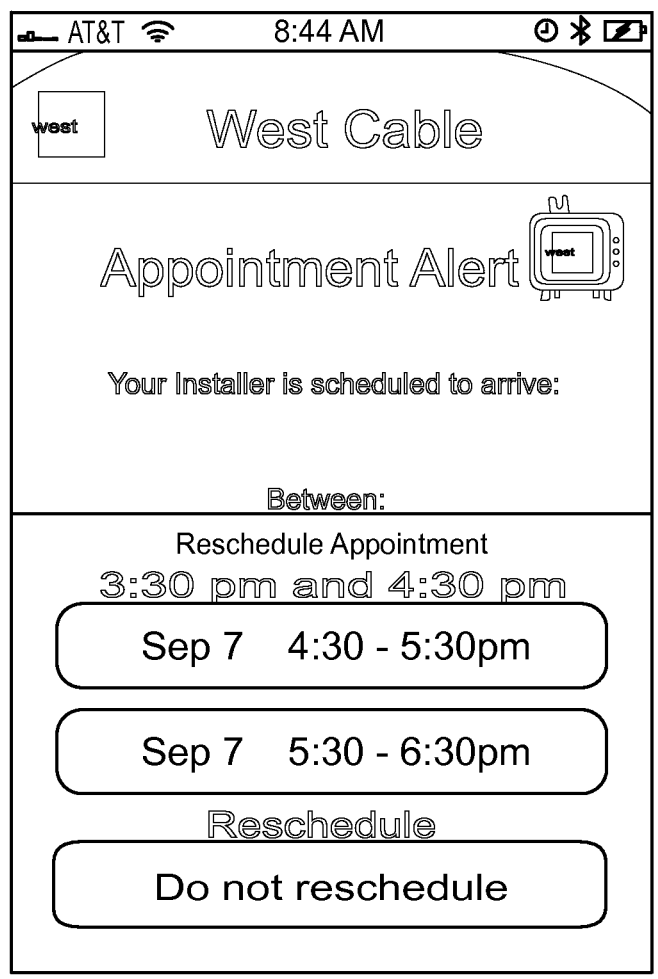
Figure 8:
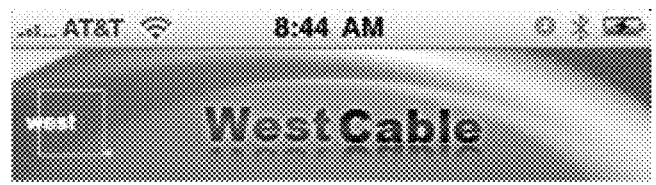

FIG. 4 depicts the appointment reminder notification that is displayed on the iphone, consistent with step 34 (FIG. 2). As shown, the displayed notification features two possible transactions or options for the user to select: Confirm or Reschedule. FIGS. 5-6 depict the transaction operations relating to an appointment confirmation, as selected by the user. FIGS. 7-8 depict the transaction operations relating to an appointment reschedule, as selected by the user. FIG. 3 is a diagram illustrating the flow of information in furtherance of conducting the rescheduling transaction displayed by FIGS. 7-8.

Referring first to FIG. 4, this screen shot displays all of the information and details relevant to the appointment reminder. According to one aspect of the invention, the reminder preferably is displayed in a dedicated screen format, instead of as an overlying pop-up, for example. In this manner, as shown, it is possible to customize the screen with a look-and-feel format that includes company branding (e.g., as in the case of SMS messages or phone reminders). The dedicated screen avoids the appearance of having the notification appear to interfere with the presentation of another application that might be running on the mobile device.

If the user wants to proceed with the scheduled appointment, and does so by selecting the Confirm tab (option button/feature/icon) in FIG. 4, then the screen shot of FIG. 5 appears. What is happening in the background is that client application 20 has sent the user's reply (appointment acceptance) to server 12 for acknowledgment and approval, consistent with steps 36, 38 (FIG. 2). In this scenario, server 12 can include the company web service URL.

If server 12 approves the appointment confirmation, then the screen shot of FIG. 6 next appears, indicating that the user's attempt at appointment confirmation has been successful. This approval rendered by server 12 is consistent with step 40 (FIG. 2).

Referring again to FIG. 4, and also to FIG. 3, if instead the user wants to reschedule the appointment, and attempts to do so by selecting the Reschedule tab in FIG. 4, then the screen shot of FIG. 7 is displayed. As shown, FIG. 7 shows a list of alternate appointment times, along with an option to decline rescheduling.

Different methods can be used to generate the FIG. 7 screen shot. The alternate appointment times can be pre-loaded, i.e., part of the payload or content of the original notification message. In this case, client application 20 already has the data on-board to compose the FIG. 7 screen. Alternately, the client application 20 can direct a reschedule request to server 12, which responds with a list of possible (optional) appointment times. This dialogue of request-response between mobile device 14 and server 12 is represented in FIG. 3 as communications 50 and 52, where the direction of the line indicates the flow of information.

The user, after reviewing the posted times in the FIG. 7 screen, can select one of the times by pressing the appropriate tab. This selection is formulated as a reschedule request that is sent from mobile device 14 to server 12 (e.g., company web service URL) for acceptance, as indicated by communication 54. If the server 12 acknowledges and accepts the user's new chosen appointment time, then server 12 responds with an approval, as indicated by communication 56.

In response, the mobile device 14 processes the server approval, and generates another screen (FIG. 8) signifying the new appointment time, per the user's prior selection. The user can confirm this newly rescheduled appointment time by pressing the Confirm tab. This confirmation request is sent to server 12 (communication 58), which replies with an acknowledgement (communication 60), thus completing the transaction. The acknowledged confirmation can be presented to the user in a screen similar to FIG. 6.

What FIG. 3 illustratively depicts is an operating mode for client application 20 that enables the user, via mobile device 14, to conduct an appointment-related transaction with server 12 that involves a series of two-way communications (bi-directional dialogue) in which information is exchanged to facilitate the transaction. In the case of FIG. 3, in reference to the screen shots of FIGS. 4 and 7-8, the chosen transaction involves selecting a new appointment time. The client application 20 can offer other transactions to the user, and conduct them in a manner similar to the process shown in FIG. 3.

Another optional transaction includes a cancel functionality. This option can be added simply by adding a "Cancel" button/feature to the reminder display. When this feature is activated, a configurable list of cancellation reasons can be displayed (optional), to allow a user to indicate why they are canceling. An option can be employed to allow free-form text entry to let the customer describe in more detail the reason for cancellation. Alternately, just the cancellation request can be honored, without requiring anything else.

Another optional transaction allows the user to call the company associated with the appointment reminder. Again, this option can be made available by simply having the feature added to the opening screen display. In one form, the call-up feature could be configured so upon activation of the tab (or selection of a call label next to it), client application 20 directs the mobile device to place a call to this number in an automated fashion. The called destination could be a call center or company office, for example.

Figure 9A:
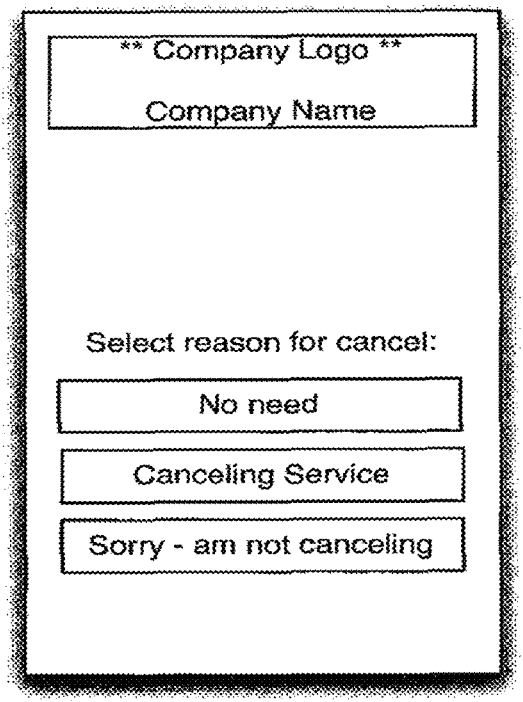
FIG. 9A shows a template useful for incorporating a cancellation feature.
Figure 9B:
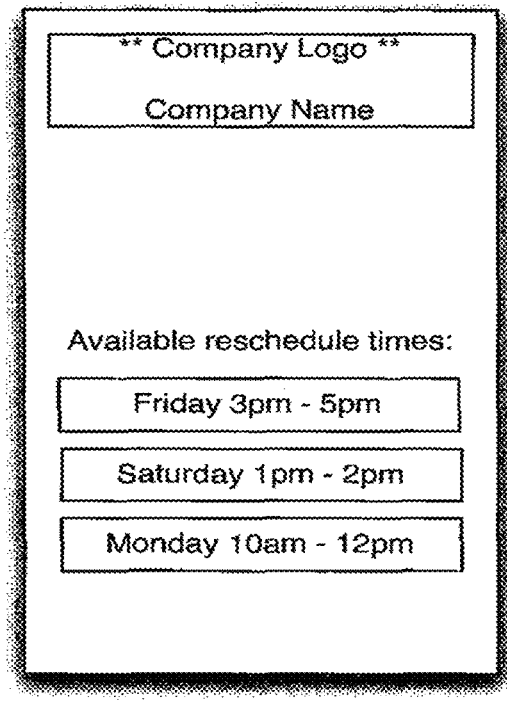
FIG. 9B shows a template useful for rescheduling, according to an embodiment of the present invention.

Referring to FIG. 9, there is shown a set of templates typical of the format used to construct and present a GUI screen shot for display on the mobile device, in connection with facilitating an appointment-related transaction. FIG. 9A shows a template useful for incorporating a cancellation feature, while FIG. 9B is useful for rescheduling (similar to FIG. 7).

These templates show a basic design format including user-selectable options for transactions, and a header area useful for displaying company-specific branding or other customized information. It should be apparent that any other format could be used to present the GUI screen displays.

The opening screen for the appointment notification will typically include a list or menu of all of the available options; for example, confirm, reschedule, or cancel the appointment, or place a call to a service center for further assistance. Based on the user's selection, the client application 20 will then proceed to display the appropriate set of screens relevant to facilitating conduct of the chosen transaction.

Figure 10:
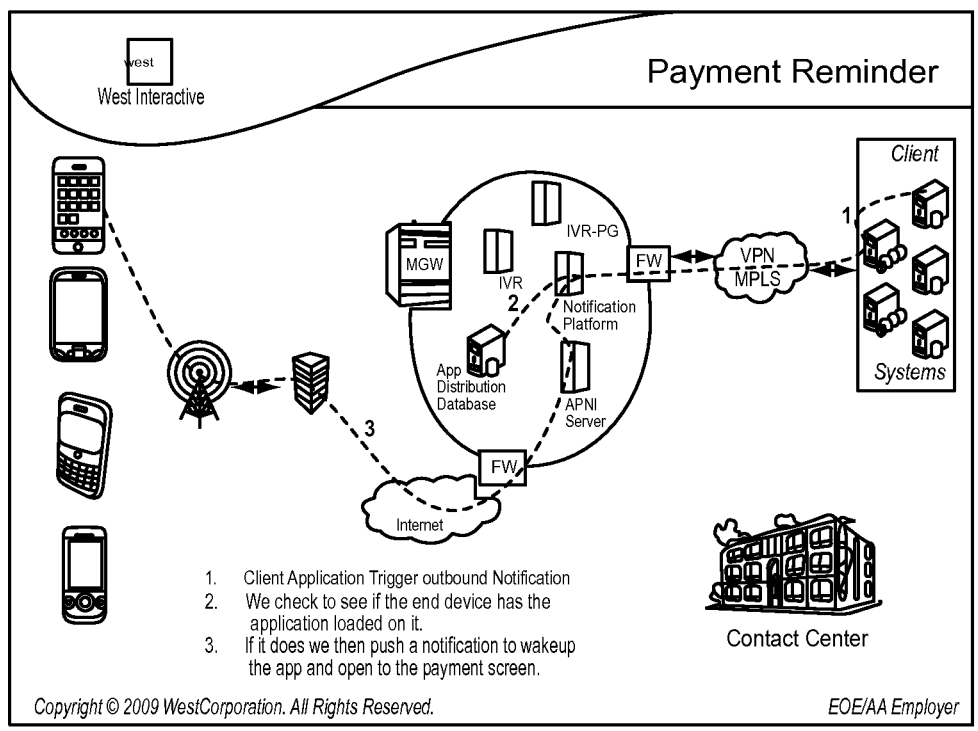
FIG. 10 is a more detailed system to block diagram implementation of FIG. 1, according to the invention.

Referring to FIG. 10, there is shown a more detailed block diagram implementation of the system shown in FIG. 1.

Referring to FIGS. 1 and 10, the mobile device 14 (client application 20) and server 12 will be suitably configured to facilitate a user-interactive transaction relating to an appointment choice made by the user. For this purpose, client application 20 includes all of the functionality needed to perform its share of transaction operations and to communicate with server 12. Likewise, server 12 will be suitably configured to support the transaction and communicate with mobile device 14. Techniques well known to those skilled in the art can be used for configuring mobile device 14 and server 12.

Any type of mobile device 14 can be employed for use in practicing the invention. For example, an iphone can be used. Any means known to those skilled in the art can be used to establish communications between and among the mobile device and server (including with the notification service).

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
processing a notification by a mobile device, wherein the processing comprises providing a user with a plurality of appointment-related transaction selections, the plurality of appointment-related transaction selections comprising a reschedule selection;
conducting, by the mobile device and a server, a user-interactive transaction, according to a transaction selection made by the user; and
displaying, by the mobile device, a plurality of available appointment times when the user selects the reschedule selection.

2. The method of claim 1, wherein the processing further comprises:
presenting the notification to the user by a display of the mobile device; and
presenting to the user, by the display, a plurality of selections, each specifying a respective appointment-related transaction.

3. The method of claim 1, wherein the conducing of the transaction, further comprises generating, by the mobile device, at least one graphical user interface display having at least one selectable feature.

4. The method of claim 3, further comprising customizing each graphical user interface, by the mobile device, with content relating to a service provider for the appointment.

5. The method of claim 1, wherein the conducing of the transaction further comprises performing at least one of confirming the appointment, rescheduling the appointment, and canceling the appointment.

6. The method of claim 5, wherein the performing confirmation of the appointment further comprises:
activating a confirmation selection presented via the mobile device;
communicating, by the mobile device, a confirmation request to the server in response to user activation of the confirmation selection;
processing, by the server, the confirmation request;
communicating, by the server, a reply to the mobile device according to the processing results, the reply including one of a confirmation approval and a confirmation denial; and
processing, by the mobile device, the server reply.

7. The method of claim 5, wherein the performing rescheduling of the appointment further comprises:
activating a reschedule selection presented via the mobile device;
communicating, by the mobile device, a reschedule request to the server in response to user activation of the reschedule selection;
processing, by the server, the reschedule request;
communicating, by the server, a reply to the mobile device; and
processing, by the mobile device, the server reply.

8. The method of claim 5, wherein the performing rescheduling of the appointment, further comprises:
activating a reschedule selection presented via the mobile device;
communicating, by the mobile device, a reschedule request to the server in response to user activation of the reschedule selection;
processing, by the server, the reschedule request;
communicating, by the server, a first reply to the mobile device, the first reply including a list of appointment times;
processing, by the mobile device, the server first reply and presenting to the user the list of appointment times as selectable items;
selecting one of the appointment times, via the mobile device;
communicating, by the mobile device, an appointment request to the server, according to the appointment time selection;
processing, by the server, the appointment request;
communicating, by the server, a second reply to the mobile device according to the processing results, the second reply comprising one of an appointment request approval and an appointment request denial; and
processing, by the mobile device, the server second reply.

9. The method of claim 1, further comprising:
displaying, by the mobile device, a confirm tab to confirm rescheduling of the appointment; and
sending, by the mobile device, a confirmation of the appointment to the server when the user selects the confirm tab.

10. A mobile device, comprising:
a processor;
memory communicably coupled to said processor; and
a client application configured to:
process a notification received from a data network, and present the notification to a user;
enable a user to select at least one of a plurality of appointment-related transaction selections, the plurality of appointment-related transaction selections comprising a reschedule selection;
enable the user to conduct, via the mobile device, a user-interactive transaction with the data network, according to a transaction selection made by the user; and
display a plurality of available appointment times when the user selects the reschedule selection.

11. The mobile device of claim 10, wherein the client application is further configured to generate at least one graphical user interface display.

12. The mobile device of claim 11, wherein the client application further configured to customize at least one graphical user interface with content relating to a service provider for the appointment.

13. The mobile device of claim 10, wherein the client application is further configured to enable the user to perform at least one of:
confirm the appointment; and
reschedule the appointment.

14. A non-transitory computer-readable medium comprising computer-executable instructions for execution by a processor, that, when executed, cause the processor to:
process a notification communicated from a data network;
present the notification to a user, via a mobile device;
enable the user to conduct, via the mobile device, a user-interactive appointment-related transaction with the data network, the appointment-related transaction comprising a reschedule selection; and
display a plurality of available appointment times when the user selects the reschedule selection.

15. The computer-readable medium according to claim 14, wherein the instructions are further configured to cause the processor to:
provide at least one graphical user interface display; and
customize the at least one graphical user interface display using content relating to a service provider for the appointment.

16. The computer-readable medium according to claim 14, wherein the instructions are further configured to cause the processor to:
provide the user with at least one selectable option to perform at least one transaction to confirm the appointment, to reschedule the appointment, and to cancel the appointment.

17. The computer-readable medium according to claim 16, wherein the instructions are further configured to cause the processor to:
in the event the user makes a confirmation selection, execute operations to facilitate a transaction to accomplish the appointment confirmation;
in the event the user makes a rescheduling selection, execute operations to facilitate a transaction to accomplish the appointment rescheduling; and
in the event the user makes a cancellation selection, execute operations to facilitate a transaction to accomplish the appointment cancellation.

18. The computer-readable medium according to claim 14, wherein the instructions are further configured to cause the processor to:
provide the user with a selectable option to confirm the appointment;
in the event the user makes a confirmation selection, communicate a confirmation request to the data network; and
process any reply from the data network developed in response to the confirmation request.

19. The computer-readable medium according to claim 14, wherein the instructions are further configured to cause the processor to:
provide the user with a selectable option to reschedule the appointment;
in the event the user makes a reschedule selection, communicate a reschedule request to the data network; and
process any reply from the data network developed in response to the reschedule request.

20. The computer-readable medium according to claim 14, wherein the instructions are further configured to cause the processor to: process and reply, when so directed by the user, to any communication received from the data network at any stage of the transaction.

* * * * *